(12) United States Patent
Souto Maior et al.

(10) Patent No.: US 10,656,278 B1
(45) Date of Patent: May 19, 2020

(54) DETECTING ASSET LOCATION DATA ANOMALIES

(71) Applicant: International Business Machines Corporation, Armonk, NY (US)

(72) Inventors: Joao Souto Maior, Jaboatao dos Guararapes (BR); Thiago Bianchi, Sao Carlos (BR); Tiago Bertoni Scarton, Sao Paolo (BR); Gary A. Cooper, Hoschton, GA (US); Suraj Shirodkar Singh, London (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/354,252

(22) Filed: Mar. 15, 2019

(51) Int. Cl.
*H04W 24/00* (2009.01)
*G01S 19/06* (2010.01)
*H04L 29/08* (2006.01)
*H04W 4/02* (2018.01)
*G01S 5/00* (2006.01)
*G01S 5/16* (2006.01)
*G01S 5/02* (2010.01)
*G08G 1/00* (2006.01)

(52) U.S. Cl.
CPC ............ *G01S 19/06* (2013.01); *G01S 5/0027* (2013.01); *G01S 5/0294* (2013.01); *G01S 5/16* (2013.01); *G08G 1/20* (2013.01); *H04L 67/12* (2013.01); *H04W 4/02* (2013.01); *G01S 2205/002* (2013.01)

(58) Field of Classification Search
CPC ........ G01S 5/0027; G01S 5/0294; G01S 5/16; G01S 19/06; G01S 2205/002; G08G 1/20; H04L 67/12; H04W 4/02

USPC ...................................................... 455/456.1
See application file for complete search history.

(56) References Cited

U.S. PATENT DOCUMENTS

| | | |
|---|---|---|
| 7,889,065 B2 | 2/2011 | Smith |
| 9,177,282 B2 | 11/2015 | Stevens et al. |
| 9,299,027 B2 | 3/2016 | Smith et al. |
| 9,841,501 B1 * | 12/2017 | Salour ........................ G01S 5/02 |
| 10,055,648 B1 * | 8/2018 | Grigsby ............. G06K 9/00771 |
| 2009/0174540 A1 | 7/2009 | Smith |
| 2011/0133888 A1 * | 6/2011 | Stevens .................. G06Q 50/28 340/8.1 |

FOREIGN PATENT DOCUMENTS

CN            106595680 A          4/2017

OTHER PUBLICATIONS

"Automatic vehicle location", Wikipedia, this page was last edited on Oct. 14, 2018, at 01:04 (UTC), 5 pages, printed on Feb. 12, 2019.
(Continued)

*Primary Examiner* — Huy C Ho
(74) *Attorney, Agent, or Firm* — David K. Mattheis; William Hartwell; Michael Petrocelli

(57) ABSTRACT

Processing location sensor data to detect location anomalies by defining a multi-cell overlay grid for a defined asset tracking area, determining a current location on the overlay grid for an asset according to location data, determining that a probability of transitioning from a previous location to the current location is below a threshold, registering the current location as an anomaly and updating the last known location of the asset to the current location.

20 Claims, 8 Drawing Sheets

(56) References Cited

OTHER PUBLICATIONS

Feng et al., "Assisted GPS and Its Impact on Navigation in Intelligent Transportation System", The IEEE 5th International Conference on Intelligent Transportation Systems, Sep. 3-6, 2002, Singapore, pp. 926-931.

Kendall, David G., "Stochastic Processes Occurring in the Theory of Queues and their Analysis by the Method of the Imbedded Markov Chain", The Annals of Mathematical Statistics, vol. 24, No. 3 (Sep. 1953), pp. 338-354, <https://www.jstor.org/stable/2236285>.

Krause et al., "Short-Term Travel Behavior Prediction with GPS, Land Use, and Point of Interest Data", Transportation Research Part B 0 0 0 (2018) 1-13, Article History: Received Mar. 22, 2018, Revised Jun. 18, 2018, Accepted Jun. 29, 2018, 13 pages, <https://doi.org/10.1016/j.trb.2018.06.012>, 0191-2615/ © 2018, Published by Elsevier Ltd.

Larson, Richard C. "Markov Models of Signpost Sensor AVL Systems", 1978, Transportation Science, vol. 12, No. 4, pp. 331-352, <https://doi.org/10.1287/trsc.12.4.331>.

Mell et al., "The NIST Definition of Cloud Computing", Recommendations of the National Institute of Standards and Technology, Special Publication 800-145, Sep. 2011, 7 pages.

Ranjit et al., "Agent-Based Modeling of Taxi Behavior Simulation with Probe Vehicle Data", International Journal of Geo-Information, Received: Mar. 10, 2018; Accepted: May 7, 2018; Published: May 8, 2018, SPRS Int. J. Geo-Inf. 2018, 7, 177, doi:10.3390/017050177, 24 pages.

Riter et al., "Automatic Vehicle Location—An Overview", IEEE Transactions on Vehicular Technology, vol. VT-26, No. 1, Feb. 1977, pp. 7-11.

Sandim et al., "Using GPS-based AVL Data to Calculate and Predict Traffic Network Performance Metrics: a Systematic Review", 2016 IEEE 19th International Conference on Intelligent Transportation Systems (ITSC), Windsor Oceanico Hotel, Rio de Janeiro, Brazil, Nov. 1-4, 2016, pp. 1692-1699.

Zhang et al., "An Improved Map Matching Algorithm for Intelligent Transportation System", ZD-003344, © 2008 IEEE, pp. 1-5.

* cited by examiner

DETECTING ASSET LOCATION DATA ANOMALIES

BACKGROUND

The disclosure relates generally to processing data from Global Positioning System (GPS) sensors. The disclosure relates particularly to detecting event anomalies in GPS-sensor data.

Demonstrated in part by the Internet of Things (IoT), the world of connected devices is growing, and the ability to track all assets is improving. Automatic vehicle location (AVL) is a powerful tool for managing fleets of vehicles such as service vehicles, emergency vehicles, and public transport vehicles such as buses and trains. It is also used to track mobile assets, such as non-wheeled construction equipment, non-motorized trailers, and mobile power generators.

Automatic vehicle location (AVL) systems track the real time location of vehicle using GPS and wireless communications technologies. AVL systems enable fleet asset managers to monitor asset locations and dispatch assets according to most effectively meet service needs. AVL has application for transportation, service, emergency response and traffic management systems.

SUMMARY

Aspects of the invention disclose methods, systems and computer readable media associated with processing location sensor data to detect location anomalies by defining a multi-cell overlay grid for a defined asset tracking area, determining a current location on the overlay grid for an asset according to location data, determining that a probability of transitioning from a previous location to the current location is below a threshold, registering the current location as an anomaly and updating the last known location of the asset to the current location.

DETAILED DESCRIPTION

GPS sensors on movable assets may generate large volumes of data. The data may easily be passed to central hubs for storage and evaluation. A large portion of the data may not have an obvious use and may require effort to transform from raw data to useful information and knowledge. The transformation should result in information which can support decisions in real-time or near real-time.

A connected car is an example of IoT where a single car can have a GPS tracker which generates an enormous amount of data. The challenge lies in making operational decisions about where the vehicle is, and where it should be. For effective operational decisions, it is important to provide a method that can extract the available knowledge in real time. It is important to determine the pattern of routes of a particular moving vehicle, and to then determine deviations from the pattern. Issues with a GPS device, communications module, and pattern deviations may each be identified with the methods described herein.

This disclosure describes a method to transform GPS data into useful information by using a probability engine, such as a Markov Chain Transition Matrix, as a tool to identify unexpected changes in the moving asset behavior. The data needs to be discretized in order to become first useful data, and then information. After this process derived information can be used in GPS tracking scenarios and in support of decision-making processes.

In an embodiment, a computer implemented process for processing motion-sensor data begins with receiving a defined target area of interest for tracking assets. Examples of this include existing cities, states, or work zone polygons. Another possible target area may be created as a new polygon that encompasses all historical collected points and also applies a buffer on its minimum and maximum points to make sure other data will be collected within this polygon. The extent of defined area may be as large as the entire globe. After defining this area, it is necessary to create an overlay grid on top of it. The minimum size of the area is determined according to the resolution available in the location data. In at least some embodiments, GPS data may have a resolution of three to four meters RMS horizontal accuracy for simple systems, more complex systems may have accuracies in the range of centimeters or millimeters. The pre-defined target tracking area may then be overlaid with an overlay or fishnet grid defining a plurality of grid cells, each cell having a length and a width. In an embodiment, the cells may be three dimensional, having length width and height, and location may be tracked accordingly within the three-dimensional tracking volume.

Figure 1:
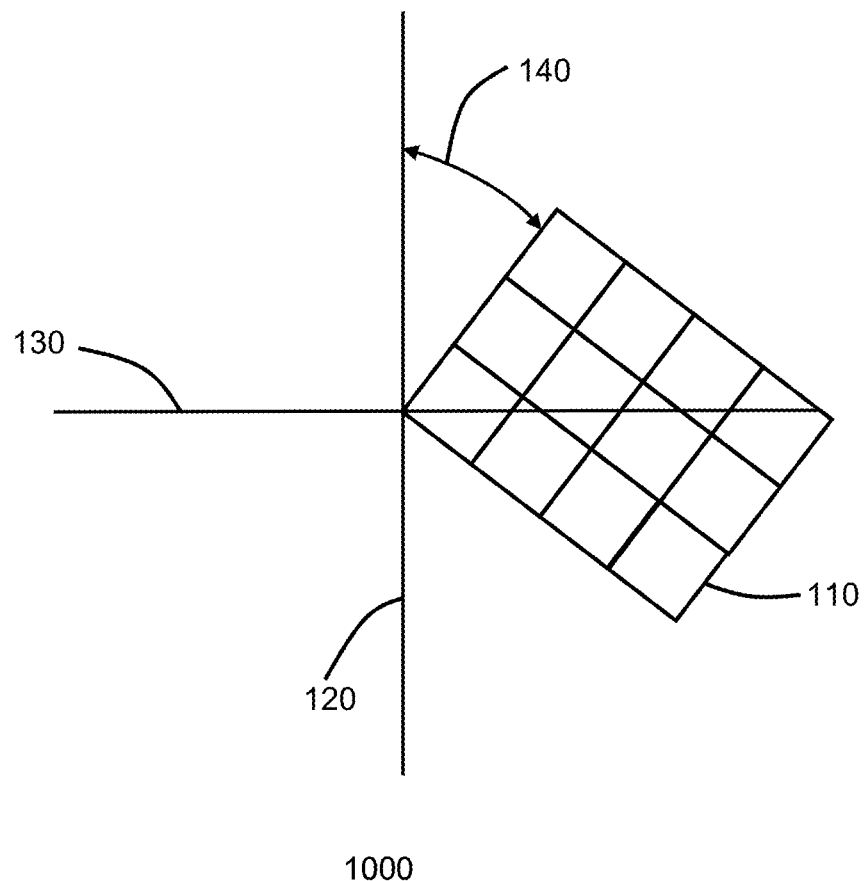
FIG. 1 provides a schematic illustration of generating an overlay for an area of interest, according to an embodiment of the invention.

In an embodiment, creating the tracking space overlay is accomplished by specifying a number of row and columns for the grid and an angle of rotation from a known set of axes related to the tracking space. For a three-dimensional space, the definitions add a number of layers and the angle of rotation includes an additional component for rotation from a vertical axis as well as in a horizontal plane. FIG. 1 illustrates the overlay of a fishnet grid created with a row, column, and angle specification.

As shown in the illustration 1000, of the figure, fishnet grid 100, having four columns and three rows of cells, is placed at an origin where axes 120 and 130 intersect. The grid 110 is rotated from axis 120 by an angle 140.

In an embodiment, the overlay is created by specifying absolute size values or ranges for the dimensions of each cell, together with the target area definition. In this embodiment, the number of rows and columns will be defined in accordance with the dimensions of the target area.

The detection of anomalies in the location data proceeds from the assignment of cell locations to each location data point. In an embodiment, a moving asset connected to the IoT using GPS equipment sends location information at periodic intervals as defined in the hardware of the asset. In addition to location, the asset also sends altitude, speed, and GPS precision information. The data is received and stored in a database which may be accessed by processors practicing the disclosed methods. The data is then used to define a cell location for the asset according to the received location data.

Data which lacks sufficient GPS precision to accurately locate the asset within the fishnet may be of no use. In an embodiment, to overcome this issue, an approximate asset location can be defined using the GPS location as an origin point and defining a location circle having a radius associated with the provided GPS precision around that point. As an example, data having a GPS precision of 4 meters would result in approximate locations represented by circles having a 4-meter radius. For instances where such circles overlay more than a single cell of the fishnet grid, the location of the asset can be defined as the cell containing the biggest portion of the circle.

Figure 2:
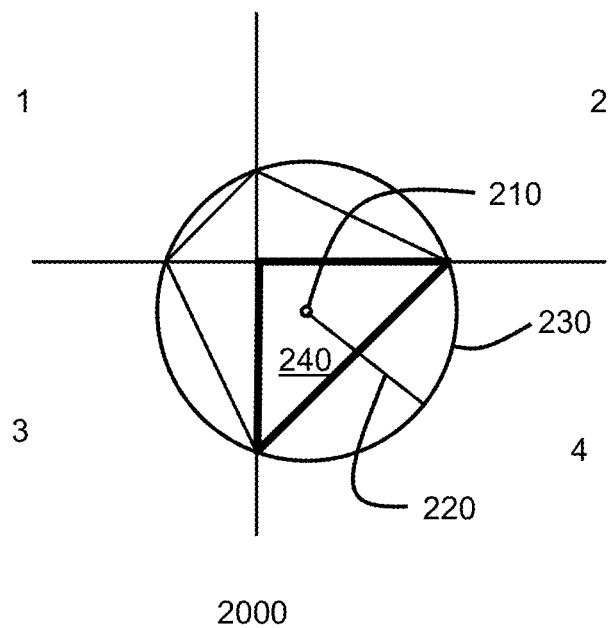
FIG. 2 provides a graphical illustration of a location determination, according to an embodiment of the invention.

In an embodiment, the areas of the respective circle portions defined by the intersection of the circle and the fishnet grid lines can be calculated. As an alternative, a simplified calculation of the relative areas in the cells may be calculated using triangles inscribed within the circle according to the grid lines and circle intersections. FIG. 2 illustrates an embodiment 2000 wherein a location data point occupies portions of four different cells, 1, 2, 3, and 4. The location is described as a circular area with an origin 210 at the approximate location and the radius 220 of the circle 230 associated with precision of the location data, such as a GPS precision, represented by a GPS data confidence value associated with the precision. The circle 230 overlays portions of each of the four cells 1, 2, 3, and 4. Triangles, such as 240, defined by cell boundaries and the intersection of the circle 230 with those boundaries, are inscribed in circle 230 for each of the four cells 1, 2, 3, and 4. The location is attributed to cell 4 as this cell contains the inscribed triangle 240, having the largest area.

The location data, now discretized as cell location data, can be used to construct models of the asset's location. The models can then be used to define patterns in asset locations and then, deviations from asset location patterns. The location patterns can be defined in terms of high probability transitions from a first location to a second and so on. Low probability transitions from a location to a next location indicate an anomaly in the asset's location.

The cell location of the fishnet can be viewed as states of the system. The Sequential locations of the moving asset are then associated with the respective cells/states of the system. A model of the states of the system can be constructed from gathered data. A Markov Chain transition Matrix can then be calculated. In an embodiment, the system can be defined with the following variables:

FNet: the m×n fishnet grid matrix;
m: the number of rows of the fishnet grid matrix;
n: the number of columns of the fishnet grid matrix;
i: the last row position in the FNet grid matrix where 0<i<m;
j: the last column position in the FNet grid matrix where 0<j<n;
$\Delta i$: the moving asset row change in the FNet grid matrix;
$\Delta j$: the moving asset column change in the FNet grid matrix;
FNet (i, j): a cell representing a GPS reading position;
MNet: the k×k Markov Chain state transition probability matrix;
p: the number of states of the Markov Chain where "p" is limited by the product m×n of the FNet matrix;
k: the last state in the Markov Chain. The state "k" can be determined by k=i+j;
l: the current state in the Markov Chain. The state "k" can be determined by:
k=i+$\Delta i$+j $\Delta j$; and
MNet (k, l): the probability P (k, l) to go from state k to state l.

The Markov state transition probability P (k, l)=MNet (k, l). It is possible to determine a probability for the moving asset to transition from position FNet(i, j) to position FNet (i+$\Delta i$, j+$\Delta j$). If the probability P (k, l) is lower than a certain predetermined threshold, an anomaly is detected. After the current location is evaluated in terms of the Markov Chain probabilities, the current state is added to the Markov state transition probability matrix MNet and the current position is now the last known position. The next location data point will then be considered in terms of the probability of a transition from the new last known position to the new current position.

Figure 3:
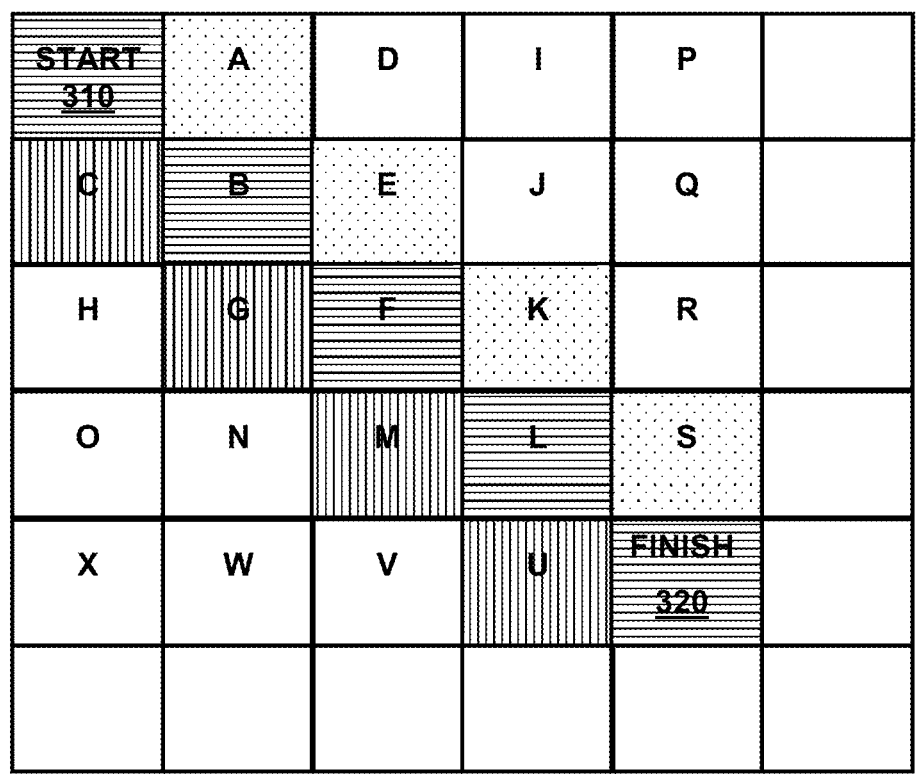
FIG. 3 provides a schematic illustration of location transition possibilities, according to an embodiment of the invention.

As illustrated in FIG. 3, a fishnet grid 3000 subdivides an area into cells. The probability for an asset to move from each to a next cell is determined according to a Markov Chain Transition Matrix built from data associated with previous transitions from START to FINISH. As the asset moves from START toward the FINISH cell, the probabilities for transitions from each new location cell are determined. In an embodiment, a transition to a low probability cell will be registered as an anomaly.

In an embodiment, depicted in FIG. 3, an asset moves from START cell 310 to the FINISH cell 320. Using a Markov Chain Transition Matrix derived from previous transits between START 310 and FINISH 320, the high probability transit proceeds from START 310, to B, F, L and then FINISH 320. Cells A, E, K, and S represent a lower probability route, as do cells C, G, M and U. Cells D, H, I, J, N, O, P, Q, R, V, W, and U represent the lowest level of calculated probability of the overlay grid 3000.

Figure 4:
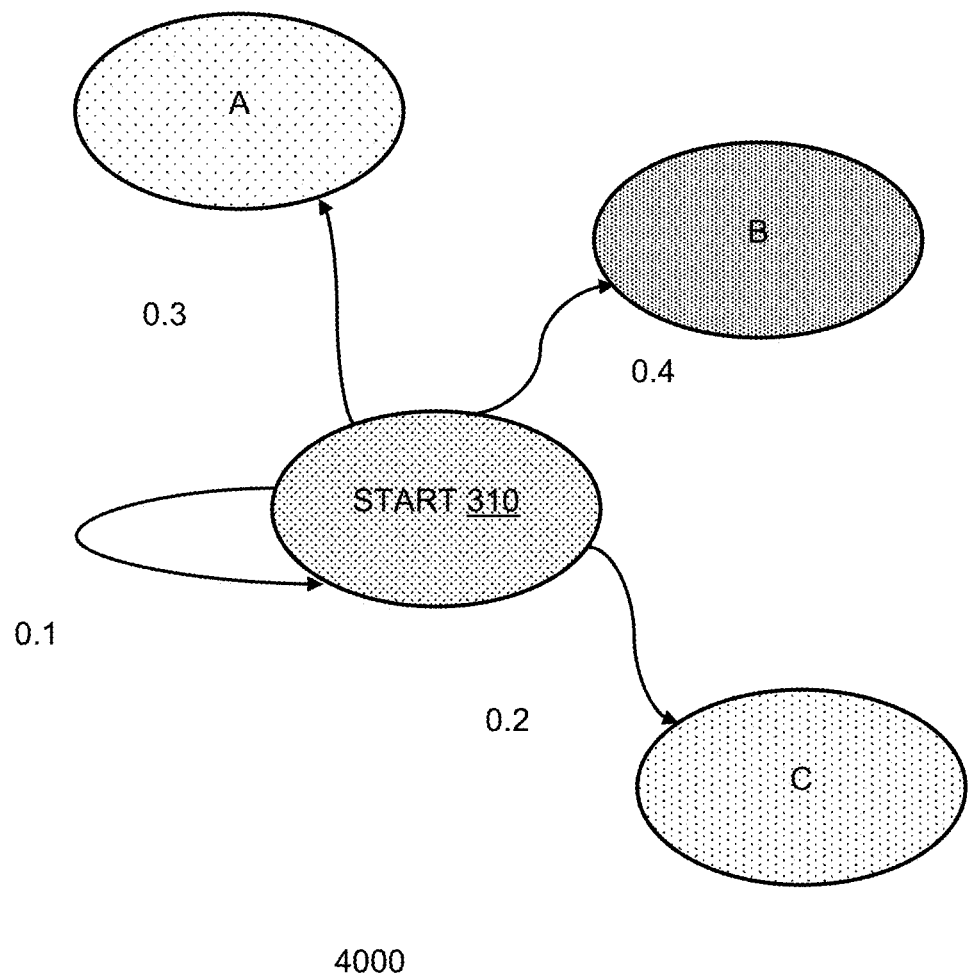
FIG. 4 provides a schematic illustration of location transition probabilities, according to an embodiment of the invention.

FIG. 4 provides an illustration 4000 of the state transitions possible from START of FIG. 3. Transitioning to B has the highest probability at 40%. Transitioning to cell A has a 30% probability. Moving to C has a 20% probability and remaining at START has a 10% probability. All other transitions have less than a 10% probability.

A threshold can be predetermined for the registering of an anomaly as the asset transitions from START. In an embodiment, a threshold of 30% would provide than any transition other than START to B or START to A would be an anomaly. The threshold may be defined by a user at any probability level associated with providing useful results regarding location anomalies.

In an embodiment, a company receives invoices for service costs related to fixed assets. These costs can include labor, materials, tools, vehicles and other miscellaneous expenses. The ability to verify that asset(s) were visited, and that work was performed is often not possible. The scenario below describes a possible solution to this issue.

For asset maintenance provided by contracted service providers, visits are scheduled. Technicians are dispatched and travel to the assets on a specified route, inspect and maintain asset(s) at each location, and submit work order information describing the as-found and final condition of the asset(s). Verification of the service items above is only provided by the narrative and info in the work order or cost summary submitted for payment.

IoT sensors associated with the fixed assets, and GPS location information associated with the contractor could be analyzed using Markov Chains to identify deviations from a prescribed route and associated changes in machine operating characteristics. Separate Markov Chain Transition Matrices can be created from asset IoT sensor data to provide probability determinations for transitions associated with timestamped state changes of the assets (On to off, high to low rpm, etc. in association with timestamps for the data.) The ability to compare location data with machine readings such as shutdown, reduced RPM, temperature, vibration, and runtime hours could verify that the service technician was within a specified proximity of the asset for a measured length of time as indicated by an invoice. A deviation in the routes traveled could indicate a missed asset maintenance stop. Correlating a technician's location at the asset, confirmed by the modified readings from the asset sensors could provide the needed verification that the assets were visited and maintained as prescribed and invoiced.

Airport ground transportation logistics are challenging and dependent on schedules being met. In an embodiment, airport assets can be monitored using the disclosed methods. In this embodiment, all vehicle classes such as aircraft, provisioning, fueling, baggage, inspection, and general maintenance vehicles, each provide an element in the ready-to-depart status of an aircraft. Any deviation in the route of these vehicles can cause delays and/or can provide an indication that something is wrong, or was missed, such as an inspection location was not visited per schedule. IoT sensor data and location information (GPS) along with analytics, can be used to create Markov Chain Transition Matrices associated with patterns of vehicle locations during normal operations. Matrices based on: a vehicle origin location or route entry point, initial travel trajectory, flight schedules, and aircraft maintenance schedules, provide a way to calculate probabilities of normal and abnormal vehicle movement and locations. Alerts can be triggered, and deviations can be quickly corrected or compensated for in order to maintain timely airport operations. Examples of events leading to alerts include: entry into restricted areas, unplanned vehicle stoppages due to break downs, and unplanned route changes—which could lead to aircraft delays or unsafe conditions due to vehicles present in the paths of operating aircraft. Asset usage patterns can be monitored and changes to the patterns altering asset utilization can be driven by anomalies detected in asset movements.

The method described above can be implemented in a variety of programming languages and, therefore, the necessary adaptations should be made depending on the chosen programming language.

Figure 5:
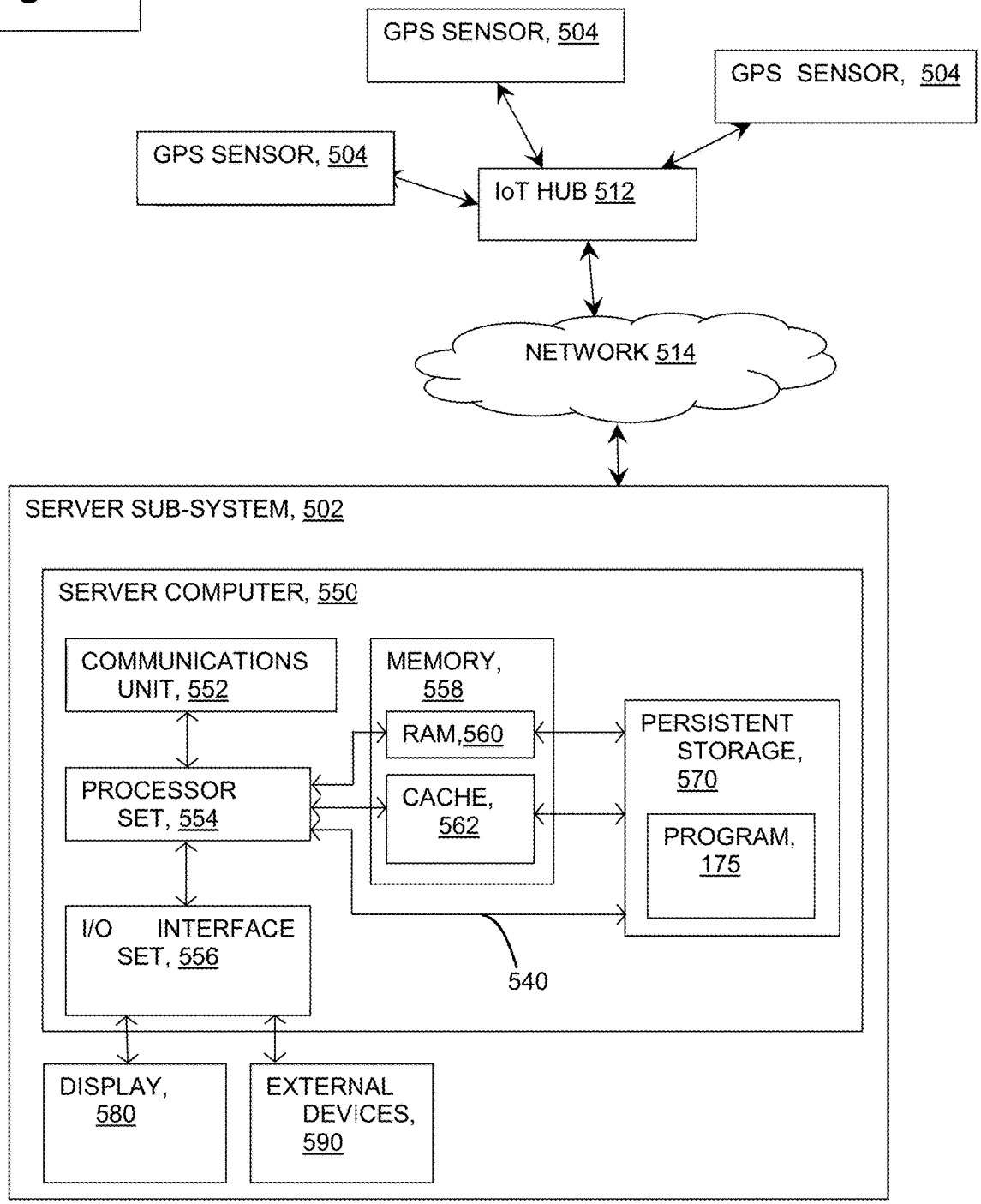
FIG. 5 provides a schematic illustration of a system, according to an embodiment of the invention.

FIG. 5 provides a schematic illustration of exemplary network resources associated with practicing the disclosed inventions. The inventions can be practiced in the processors of any of the disclosed elements which process an instruction stream. As shown in the figure, IoT GPS sensors 504 connects wirelessly to server sub-system 502 via IoT hub 512 and network 514. As shown in FIG. 5, server sub-system 502 comprises a server computer 550. FIG. 5 depicts a block diagram of components of server computer 550 within a networked computer system 5000, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server computer 550 can include processor(s) 554, cache 562, memory 558, persistent storage 570, communications unit 552, input/output (I/O) interface(s) 556 and communications fabric 540. Communications fabric 540 provides communications between cache 562, memory 558, persistent storage 570, communications unit 552, and input/output (I/O) interface(s) 556. Communications fabric 540 can be implemented with any architecture designed for passing data and/or control information between processors (such as microprocessors, communications and network processors, etc.), system memory, peripheral devices, and any other hardware components within a system. For example, communications fabric 540 can be implemented with one or more buses.

Memory 558 and persistent storage 570 are computer readable storage media. In this embodiment, memory 558 includes random access memory 560 (RAM). In general, memory 558 can include any suitable volatile or non-volatile computer readable storage media. Cache 562 is a fast memory that enhances the performance of processor(s) 554 by holding recently accessed data, and data near recently accessed data, from memory 558.

Program instructions and data used to practice embodiments of the present invention, e.g., the data processing program 175, are stored in persistent storage 570 for execution and/or access by one or more of the respective processor (s) 554 of server computer 550 via cache 562. In this embodiment, persistent storage 570 includes a magnetic hard disk drive. Alternatively, or in addition to a magnetic hard disk drive, persistent storage 570 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 570 may also be removable. For example, a removable hard drive may be used for persistent storage 570. Other examples include optical and magnetic disks, thumb drives, and smart cards that are inserted into a drive for transfer onto another computer readable storage medium that is also part of persistent storage 570.

Communications unit 552, in these examples, provides for communications with other data processing systems or devices, including resources of IoT location sensing devices 504. In these examples, communications unit 552 includes one or more network interface cards. Communications unit 552 may provide communications through the use of either or both physical and wireless communications links. Software distribution programs, and other programs and data used for implementation of the present invention, may be downloaded to persistent storage 570 of server computer 550 through communications unit 552.

I/O interface(s) 556 allows for input and output of data with other devices that may be connected to server computer 550. For example, I/O interface(s) 556 may provide a connection to external device(s) 590 such as a keyboard, a keypad, a touch screen, a microphone, a digital camera, and/or some other suitable input device. External device(s) 590 can also include portable computer readable storage media such as, for example, thumb drives, portable optical or magnetic disks, and memory cards. Software and data used to practice embodiments of the present invention, e.g., data processing program 175 on server computer 550, can be stored on such portable computer readable storage media and can be loaded onto persistent storage 570 via I/O interface(s) 556. I/O interface(s) 556 also connect to a display 580.

Display 580 provides a mechanism to display data to a user and may be, for example, a computer monitor. Display 580 can also function as a touch screen, such as a display of a tablet computer.

Figure 6:
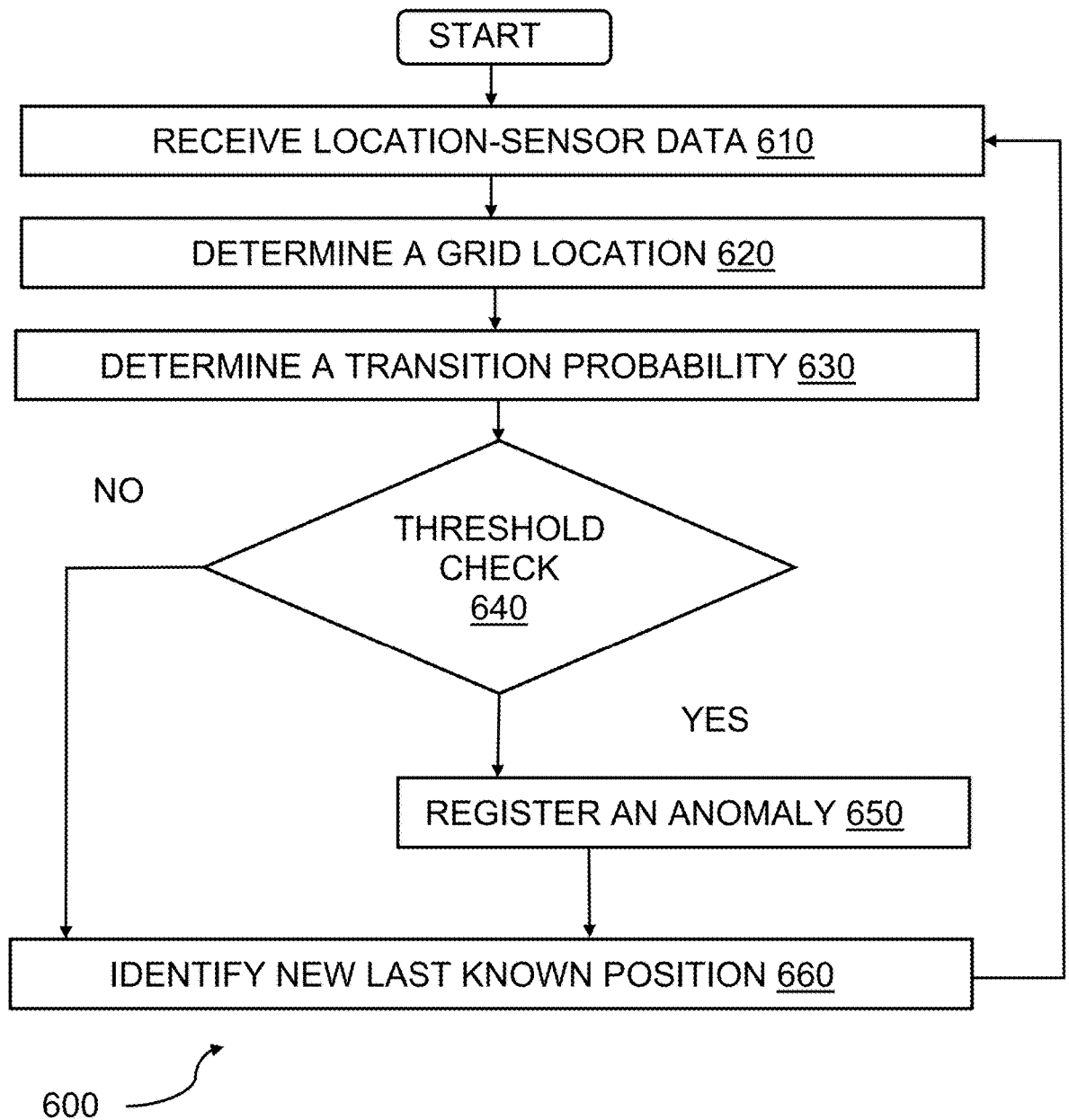
FIG. 6 provides a flowchart depicting an operational sequence, according to an embodiment of the invention.

FIG. 6 provides a flowchart 600, illustrating exemplary activities associated with the practice of the disclosure. After program start, the system receives location-sensor data at 610. The data comprises a time stamp and location data such as GPS data. The system determines a location for the asset on a defined fishnet grid of cells according to the location data at 620. The location can be defined as a selection among a number of cells when the location data overlays portions of more than a single cell. At 630, the system determines a probability of transitioning from a previous location to the new current location according to a probability engine such as a Markov Chain Transition Matrix derived from previous location data. The determined probability of the transition is compared to a threshold value at 640. Probabilities less than the threshold indicate low likelihood transitions and lead to registering an anomaly at 650. Probabilities above the threshold indicate a normal position for the asset and no anomaly is registered. At 660 the system identifies the current location of the asset as the last known position of the asset and the system returns to 610 to receive additional location data about the asset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
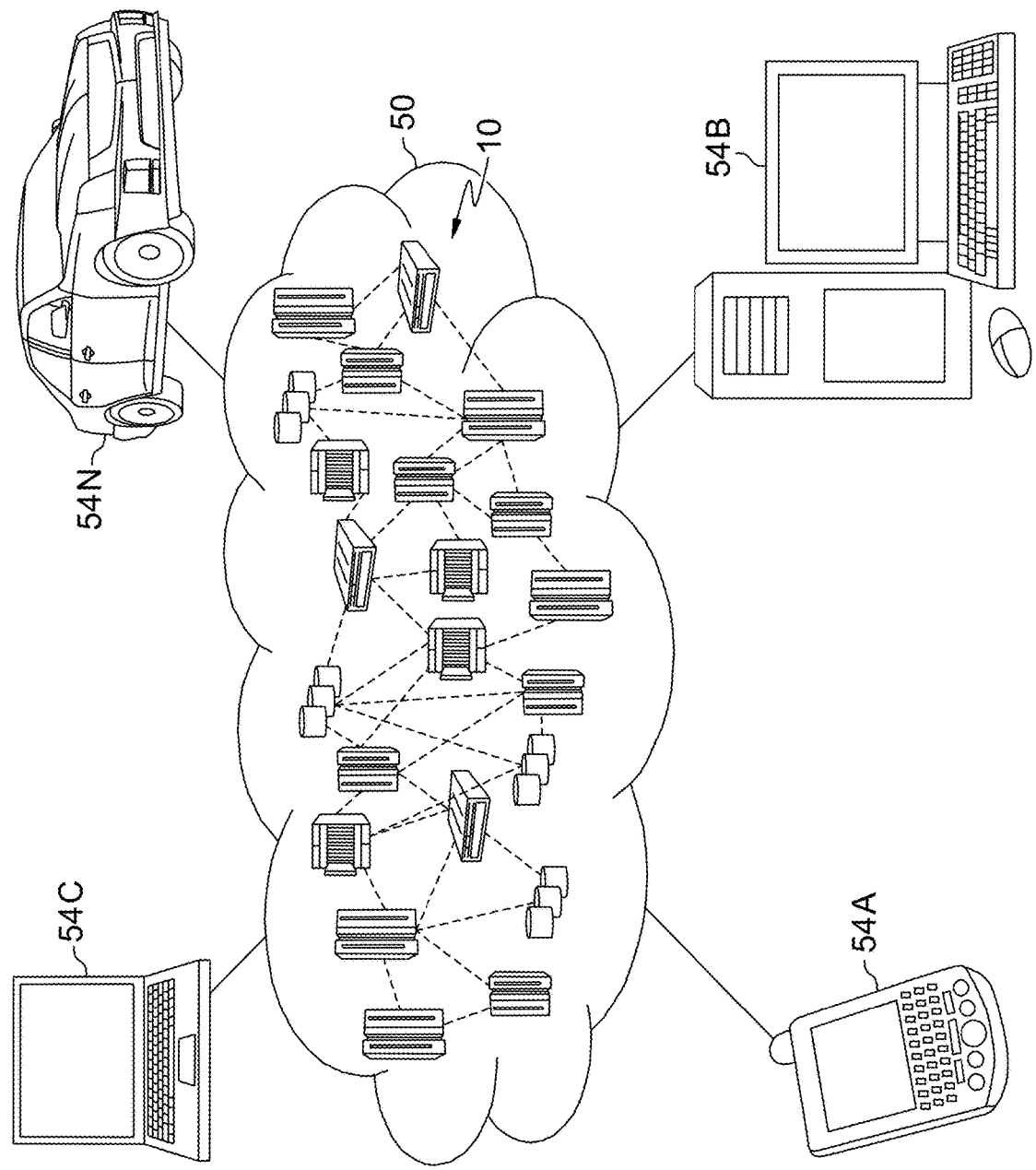
FIG. 7 depicts a cloud computing environment, according to an embodiment of the invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
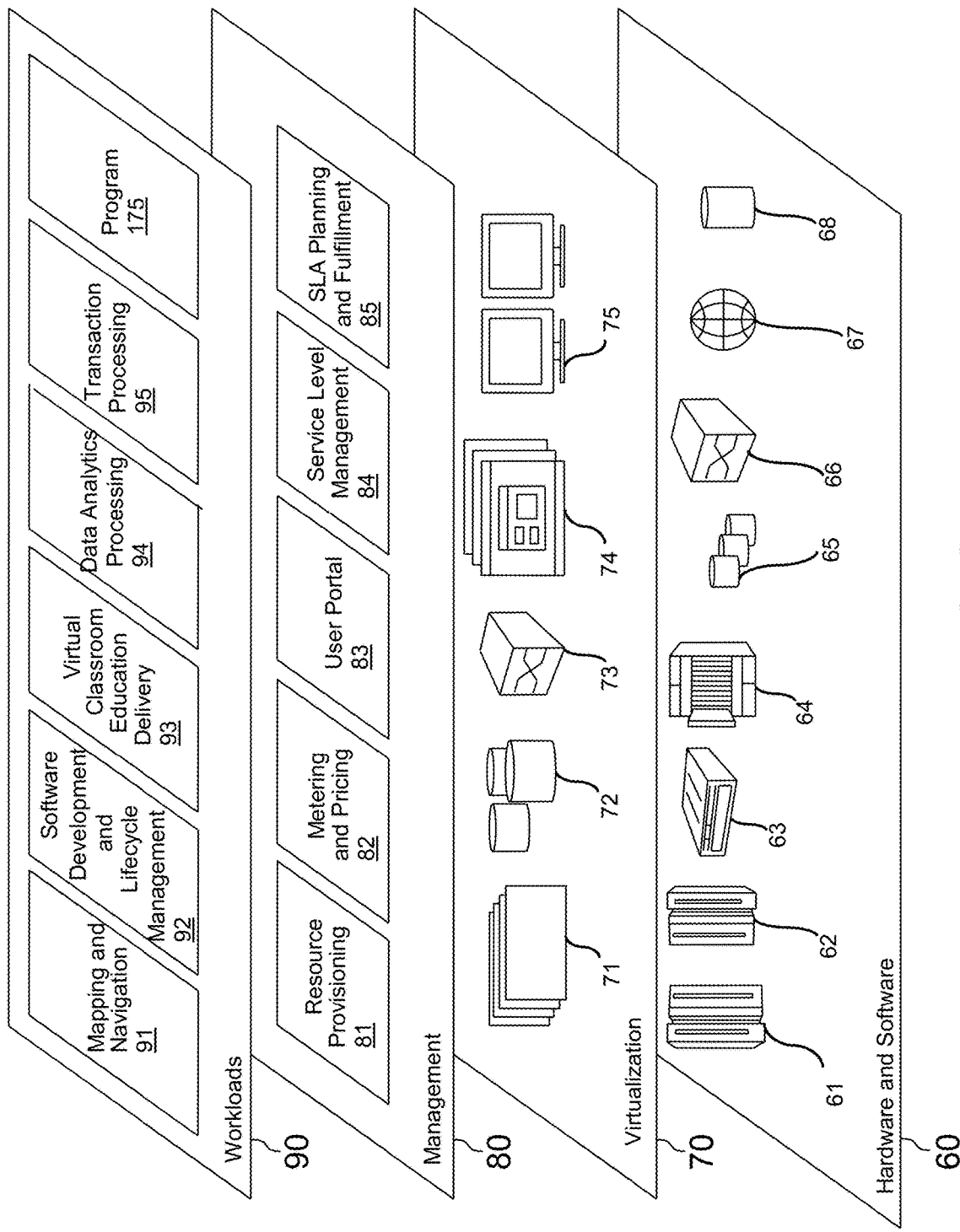
FIG. 8 depicts abstraction model layers, according to an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data processing program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for processing location sensor data, the computer implemented process comprising:
   receiving, by one or more computer processors, a defined area for tracking assets;
   defining, by one or more computer processors, an overlay grid associated with the defined area, the overlay comprising a plurality of cells;
   receiving, by one or more computer processors, location sensor data for a moving asset;
   identifying, by one or more computer processors, a current location of a moving asset associated with the overlay grid;
   calculating, by one or more computer processors according to a probability engine, a probability of transitioning from a previous location to a current location associated with overlay grid;
   determining, by one or more computer processors, that the probability of transitioning from a previous location to a current location associated with the overlay grid, is less than a predetermined value;
   registering, by one or more computer processors, an anomaly associated with the current location; and
   identifying, by one or more computer processors, the current position as a last known position of the moving asset.

2. The computer implemented method according to claim 1, wherein creating an overlay grid comprises:
   creating, by one or more computer processors, an overlay grid associated with the defined area using information comprising an extent of the overlay grid, a number of rows and a number of columns of the overlay grid and an angle of rotation of the overlay grid relative to an origin.

3. The computer implemented method according to claim 1, wherein creating an overlay grid comprises:
   creating, by one or more computer processors, an overlay grid associated with the defined area using information comprising an extent of the overlay grid, and dimensions for the cells of the overlay grid.

4. The computer implemented method according to claim 1, wherein receiving location sensor data from a moving asset comprises receiving, by one or more computer processors, data including: current location information, in predefined time intervals.

5. The computer implemented method according to claim 1, wherein determining a probability according to a probability engine further comprises:
   defining, by one or more computer processors, a Markov Chain Transition Matrix, wherein each cell of the overlay grid represents a state in the Markov chain;
   defining, by one or more computer processors, a state associated with the current position as a particular cell of the overlay grid;
   calculating, by one or more computer processors, a state transition probability matrix corresponding to the overlay grid; and
   calculating, by one or more computer processors, a probability of the moving asset transitioning from a previous position to the current position.

6. The computer implemented method according to claim 1, further comprising altering, by one or more computer processors, the utilization pattern for the moving asset.

7. The computer implemented method according to claim 1, wherein determining a current location of a moving asset associated with the overlay grid comprises:
- determining, by one or more computer processors, an approximate moving asset location as a circular area defined according to location data as the origin of the circle and a radius defined according to a location data confidence value, wherein the approximate moving asset location comprises a plurality of overlay grid cells; and
- defining, by one or more computer processors, the cell associated with the current location of the moving asset as that cell having a triangle defined by the intersection of the circle and the cell boundaries of the overlay grid having a largest area among such triangles.

8. A computer program product for processing sensor data, the computer program product comprising one or more computer readable storage devices and stored program instructions on the one or more computer readable storage devices, the stored program instructions comprising:
- programmed instructions for receiving a defined area for tracking assets;
- programmed instructions for defining an overlay grid associated with the defined area, the overlay comprising a plurality of cells;
- programmed instructions for receiving location sensor data for a moving asset;
- programmed instructions for determining a current location of a moving asset associated with the overlay grid;
- programmed instructions for determining according to a probability engine, a probability of transitioning from a previous location to a current location associated with overlay grid;
- programmed instructions for determining that the probability of transitioning from a previous location to a current location associated with the overlay grid, is less than a predetermined value;
- programmed instructions for registering an anomaly associated with the current location; and
- programmed instructions for identifying the current position as a last known position of the moving asset.

9. The computer program product according to claim 8, wherein programmed instructions for creating an overlay grid comprise:
- programmed instructions for creating an overlay grid associated with the defined area using information comprising an extent of the overlay grid, a number of rows and a number of columns of the overlay grid and an angle of rotation of the overlay grid relative to an origin.

10. The computer program product according to claim 8, wherein programmed instructions for creating an overlay grid comprise:
- programmed instructions for creating an overlay grid associated with the defined area using information comprising an extent of the overlay grid, and dimensions for the cells of the overlay grid.

11. The computer program product according to claim 8, wherein programmed instructions for receiving location sensor data from a moving asset comprise programmed instructions for receiving data including: current location information, in predefined time intervals.

12. The computer program product according to claim 8, wherein programmed instructions for determining a probability according to a probability engine further comprise:
- programmed instructions for defining a Markov Chain Transition Matrix, wherein each cell of the overlay grid represents a state in the Markov chain;
- programmed instructions for defining a state associated with the current position as a particular cell of the overlay grid;
- programmed instructions for calculating a state transition probability matrix corresponding to the overlay grid; and
- programmed instructions for calculating a probability of the moving asset transitioning from a previous position to the current position.

13. The computer program product according to claim 8, the stored program instructions further comprising programmed instructions for altering the utilization pattern for the moving asset.

14. The computer program product according to claim 8, wherein programmed instructions for determining a current location of a moving asset associated with the overlay grid comprise:
- programmed instructions for determining an approximate moving asset location as a circular area defined according to location data as the origin of the circle and a radius defined according to a location data confidence value, wherein the approximate moving asset location comprises a plurality of overlay grid cells; and
- programmed instructions for defining the cell associated with the current location of the moving asset as that cell having a triangle defined by the intersection of the circle and the cell boundaries of the overlay grid having a largest area among such triangles.

15. A computer system for processing sensor data, the computer system comprising:
- one or more computer processors;
- one or more computer readable storage devices;
- stored program instructions on the one or more computer readable storage devices for execution by the at least on computer processor, the stored program instructions comprising:
  - programmed instructions for receiving a defined area for tracking assets;
  - programmed instructions for defining an overlay grid associated with the defined area, the overlay comprising a plurality of cells;
  - programmed instructions for receiving location sensor data for a moving asset;
  - programmed instructions for determining a current location of a moving asset associated with the overlay grid;
  - programmed instructions for determining according to a probability engine, a probability of transitioning from a previous location to a current location associated with overlay grid;
  - programmed instructions for determining that the probability of transitioning from a previous location to a current location associated with the overlay grid, is less than a predetermined value;
  - programmed instructions for registering an anomaly associated with the current location; and
  - programmed instructions for identifying the current position as a last known position of the moving asset.

16. The computer system according to claim 15, wherein programmed instructions for creating an overlay grid comprise:
- programmed instructions for creating an overlay grid associated with the defined area using information comprising an extent of the overlay grid, a number of rows and a number of columns of the overlay grid and an angle of rotation of the overlay grid relative to an origin.

17. The computer system according to claim 15, wherein programmed instructions for creating an overlay grid comprise:
    programmed instructions for creating an overlay grid associated with the defined area using information comprising an extent of the overlay grid, and dimensions for the cells of the overlay grid.

18. The computer system according to claim 15, wherein programmed instructions for receiving location sensor data from a moving asset comprise programmed instructions for receiving data including: current location information, in predefined time intervals.

19. The computer system according to claim 15, wherein programmed instructions for determining a probability according to a probability engine further comprise:

programmed instructions for defining a Markov Chain Transition Matrix, wherein each cell of the overlay grid represents a state in the Markov chain;

programmed instructions for defining a state associated with the current position as a particular cell of the overlay grid;

programmed instructions for calculating a state transition probability matrix corresponding to the overlay grid; and programmed instructions for calculating a probability of the moving asset transitioning from a previous position to the current position.

20. The computer system according to claim 15, the stored program instructions further comprising programmed instructions for altering the utilization pattern for the moving asset.

* * * * *